US012688670B2

(12) United States Patent
Shimasaki

(10) Patent No.: US 12,688,670 B2
(45) Date of Patent: Jul. 21, 2026

(54) STORAGE MEDIUM, INFORMATION PROCESSING APPARATUS, AND CONTROL METHOD FOR CONTROLLING THE SAME

(71) Applicant: CANON KABUSHIKI KAISHA, Tokyo (JP)

(72) Inventor: Shin Shimasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/444,506

(22) Filed: Feb. 16, 2024

(65) Prior Publication Data

US 2024/0282026 A1     Aug. 22, 2024

(30) Foreign Application Priority Data

Feb. 21, 2023     (JP) ................................. 2023-024843

(51) Int. Cl.
| | |
|---|---|
| *G06T 11/60* | (2026.01) |
| *G06T 3/40* | (2024.01) |
| *G06T 7/90* | (2017.01) |
| *G06V 10/56* | (2022.01) |
| *G06V 10/60* | (2022.01) |
| *G06V 10/74* | (2022.01) |

(52) U.S. Cl.
CPC ................ *G06T 11/60* (2013.01); *G06T 3/40* (2013.01); *G06T 7/90* (2017.01); *G06V 10/56* (2022.01); *G06V 10/60* (2022.01); *G06V 10/761* (2022.01); *G06T 2207/10024* (2013.01)

(58) Field of Classification Search
CPC ...................................................... G06T 11/60
See application file for complete search history.

(56) References Cited

U.S. PATENT DOCUMENTS

| | | | | |
|---|---|---|---|---|
| 2010/0158360 A1* | 6/2010 | Dai | ......................... | H04N 19/12 |
| | | | | 382/164 |
| 2024/0135602 A1* | 4/2024 | Ji | ............................ | G06T 11/00 |

FOREIGN PATENT DOCUMENTS

JP          2018132648 A          8/2018

* cited by examiner

*Primary Examiner* — Shivang I Patel
(74) *Attorney, Agent, or Firm* — Canon U.S.A., Inc. IP Division

(57) ABSTRACT

A storage medium, storing an application program for editing a content, stores a program that causes a computer of an information processing apparatus to execute, based on information regarding a first color of a predetermined region including the content and information regarding a color of the content, changing the first color of the predetermined region to a second color different from the first color.

20 Claims, 16 Drawing Sheets

| | RGB | HSV |
|---|---|---|
| CONTENT END PORTION COLOR | 255, 255, 235 | 60, 7, 100 |
| BACKGROUND COLOR | 254, 252, 244 | 48, 4, 100 |

| | RGB | HSV |
|---|---|---|
| CONTENT END PORTION COLOR | 255, 255, 235 | 60, 7, 100 |
| BACKGROUND COLOR (BEFORE CHANGE) | 254, 252, 244 | 48, 4, 100 |
| BACKGROUND COLOR (AFTER CHANGE) | 255, 240, 183 | 48, 28, 100 |

| | RGB | HSV |
|---|---|---|
| CONTENT END PORTION COLOR | 255, 255, 235 | 60, 7, 100 |
| BACKGROUND COLOR (BEFORE CHANGE) | 254, 252, 244 | 48, 4, 100 |
| BACKGROUND COLOR (AFTER CHANGE) | 244, 253, 255 | 190, 4, 100 |

| | RGB | HSV |
|---|---|---|
| CONTENT END PORTION COLOR | (255, 255, 235) | (60, 7, 100) |
| BACKGROUND COLOR (BEFORE CHANGE) | (254, 252, 244) | (48, 4, 100) |
| BACKGROUND COLOR (AFTER CHANGE) | (255, 240, 183) | (48, 28, 100) |

| | RGB | HSV |
|---|---|---|
| CONTENT END PORTION COLOR | (255, 255, 235) | (60, 7, 100) |
| BACKGROUND COLOR (BEFORE CHANGE) | (254, 252, 244) | (48, 4, 100) |
| BACKGROUND COLOR (AFTER CHANGE) | (255, 228, 122) | (48, 52, 100) |

| | RGB | HSV |
|---|---|---|
| CONTENT END PORTION COLOR | (255, 255, 235) | (60, 7, 100) |
| BACKGROUND COLOR (BEFORE CHANGE) | (254, 252, 244) | (48, 4, 100) |
| BACKGROUND COLOR (AFTER CHANGE) | (255, 240, 183) | (48, 52, 100) |

STORAGE MEDIUM, INFORMATION PROCESSING APPARATUS, AND CONTROL METHOD FOR CONTROLLING THE SAME

BACKGROUND

Field of the Disclosure

The present disclosure relates to a storage medium, an information processing apparatus, and a control method for controlling the same.

Description of the Related Art

Application programs for editing or generating a content such as a document or a poster are known. In such programs, it is typical that a user edits a content while visually confirming the content.

Japanese Patent Application Laid-Open No. 2018-132648 discusses a technique for, if the difference in luminance between a content image and a background image is less than or equal to a certain value based on the difference in luminance, temporarily changing the background image, thereby heightening the visibility of the content image and the background image. However, an improvement in the visibility in an application program for editing a content image is not discussed.

SUMMARY

According to an aspect of the present disclosure, a storage medium storing an application program for editing a content stores a program that causes a computer of an information processing apparatus to execute, based on information regarding a first color of a predetermined region including the content and information regarding a color of the content, changing the first color of the predetermined region to a second color different from the first color.

Further features of the present disclosure will become apparent from the following description of embodiments with reference to the attached drawings.

DESCRIPTION OF THE EMBODIMENTS

Embodiments of the present disclosure will be described in detail below with reference to the attached drawings. The following embodiments do not limit the present disclosure according to the appended claims, and not all the combinations of the features described in the embodiments are essential for a method for solving the issues in the present disclosure.

Figure 1:
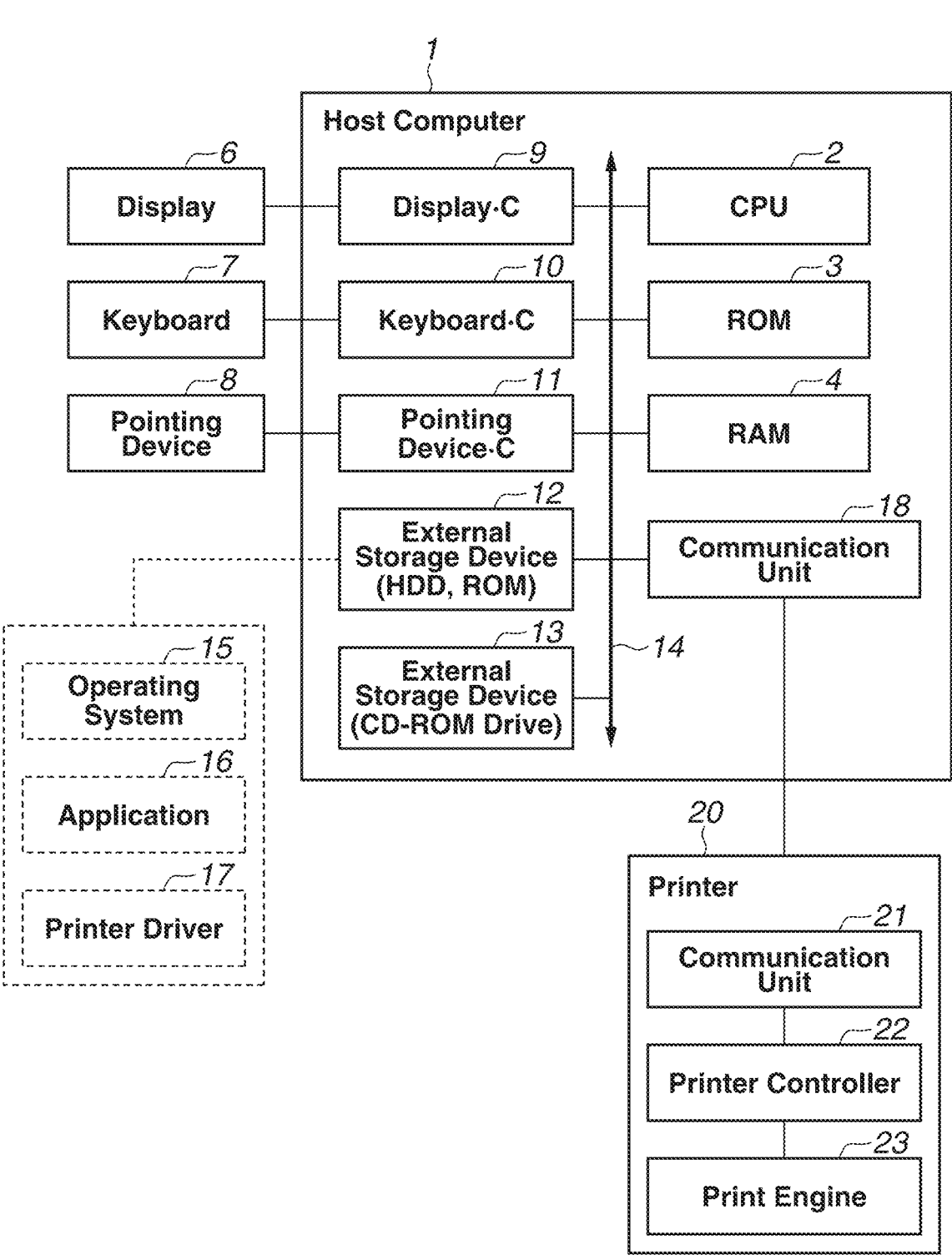
FIG. 1 is a block diagram illustrating a configuration of an information processing apparatus according to a first embodiment.

FIG. 1 is a block diagram illustrating a general configuration of an information processing apparatus according to a first embodiment.

In FIG. 1, a host computer 1 as an example of a data processing apparatus is a computer, such as a personal computer and a workstation, or a mobile terminal (a terminal), such as a smartphone and a tablet personal computer (PC). The host computer 1 includes a central processing unit (CPU) 2.

When the host computer 1 is started, the CPU 2 loads an operating system (OS) 15 stored in an external storage device 12 into a random-access memory (RAM) 4 according to a program stored in a read-only memory (ROM) 3. The host computer 1 performs overall control of this system via a system bus 14 by the CPU 2 running the OS 15.

According to control of the CPU 2, a display controller 9 controls a display 6 (a display unit or a display device) that performs various types of display, such as an error warning and a processing state. A keyboard controller 10 controls a keyboard 7 as an input device. A pointing device controller 11 controls a pointing device 8 as an input device. In the case of the smartphone or the tablet PC, the host computer 1 is not accompanied by the keyboard 7 and the pointing device 8. Thus, a configuration can be employed in which a touch sensor is mounted on the display 6 and has functions equivalent to those of the keyboard 7 and the pointing device 8.

The external storage device (a hard disk drive (HDD) or a ROM) 12 stores the OS 15. An external storage device (a compact disc read-only memory (CD-ROM) drive) 13 can read data stored in a CD-ROM. In the present embodiment, an application 16 is installed on the host computer 1 and then stored in the external storage device (the HDD or the ROM) 12. In the case of the smartphone or the tablet PC, a storage device may be configured only with the external storage device (the HDD or the ROM) 12 in the terminal.

The application 16 is software that achieves particular work on the host computer 1 according to an operation of a user. For example, the application 16 can display, edit, or print a document file.

A printer driver 17 is software that, according to an instruction from the application 16, generates a command that can be interpreted by a printer 20, and transmits image data to be printed to the printer 20, thereby instructing the printer 20 to print the image data.

The printer 20 includes a print engine 23 that operates a printer head and conveys a sheet, and a printer controller 22 that interprets print data received from the host computer 1 and controls the print engine 23.

A communication unit 18 is a component that connects to a communication unit 21 of the printer 20 and communicates data with the printer 20. For example, the communication unit 18 can connect to an access point (not illustrated) in the communication unit 21. The communication unit 18 and the access point in the communication unit 21 connect to each other, whereby the host computer 1 and the printer 20 can communicate with each other. The communication unit 18 may directly communicate with the communication unit 21 through wireless communication, or may communicate with the communication unit 21 via an external access point (not illustrated) present outside the host computer 1 or the communication unit 21. Examples of the wireless communication method include Wireless Fidelity (Wi-Fi)® and Bluetooth®. Examples of the external access point include a device, such as a wireless local area network (LAN) router. In the present embodiment, a method in which the host computer 1 and the printer 20 directly connect to each other not via the external access point is referred to as a "direct connection method". A method in which the host computer 1 and the printer 20 connect to each other via the external access point is referred to as an "infrastructure connection method".

As an example, the sharing of processing between the host computer 1 and the printer 20 is as illustrated above. The sharing form, however, is not particularly limited to this, and may be another form.

Figure 2:
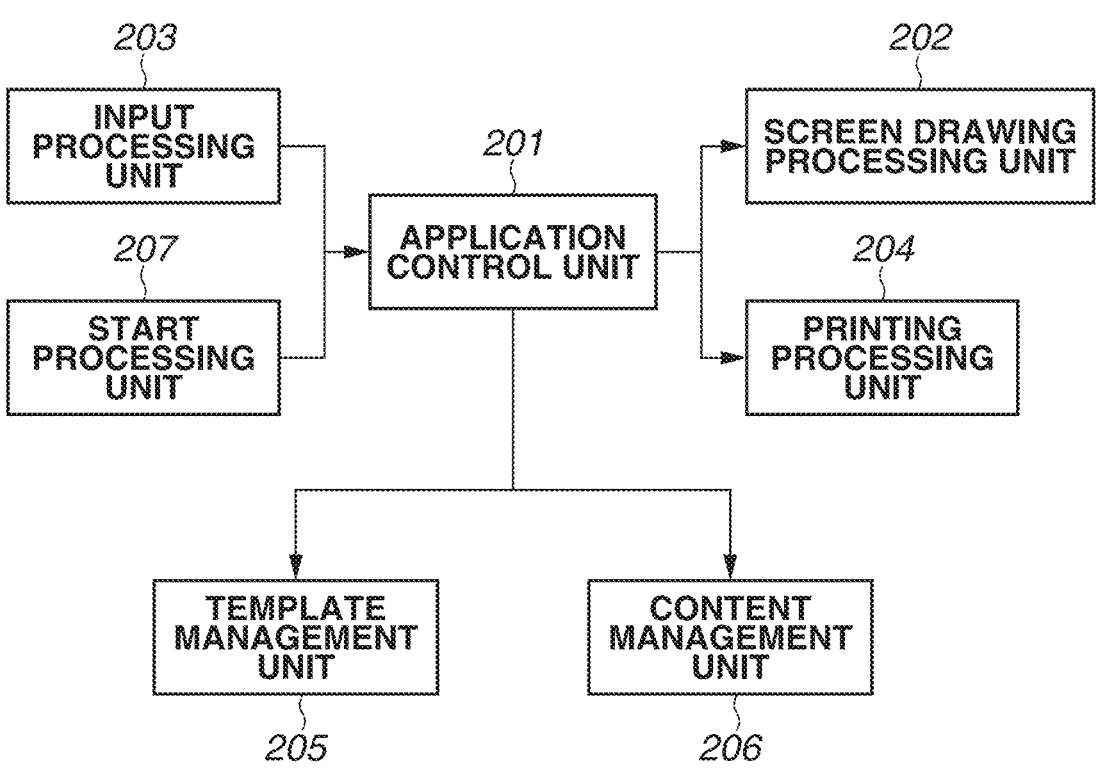
FIG. 2 is a block diagram illustrating a software configuration according to the first embodiment.

FIG. 2 is a block diagram illustrating a software configuration according to the first embodiment.

In the present embodiment, the application 16 saved in the host computer 1 is a content generation application 16 capable of giving an instruction to edit, display, or print a document. The configuration of this software, however, may be applied not only to this, but also to software having another purpose. The content generation application 16 is installed on the mobile terminal and operates, but may operate as a web application program that operates on a browser. In the form in which the content generation application 16 operates on the browser, the content generation application 16 as the web application program edits a content on the browser, and the content generation application 16 in the host computer 1 executes a printing process.

An application control unit 201 controls the entire processing of the content generation application 16. According to an instruction from the application control unit 201, a screen drawing processing unit 202 creates information to be displayed on the display 6. An input processing unit 203 converts an input from the keyboard 7 or the pointing device 8 into a command in the application 16. For example, if a character is input to the input processing unit 203 using the keyboard 7, the input processing unit 203 transmits information regarding the input character to the application control unit 201. A printing processing unit 204 issues a print command to the printer 20. The printing processing unit 204 receives image information and document information from a content management unit 206, converts the image information and the document information into print data that can be interpreted by the printer 20, and transmits the print data to the printer 20 via the communication unit 18.

A template management unit 205 manages template data of a content designed in advance.

A template is held on an external server (not illustrated). If the content generation application 16 is started, the content generation application 16 acquires the template from the external server. A configuration may be employed in which templates are saved in advance in the content generation application 16, and if the content generation application 16 is started, the template management unit 205 holds information regarding a list of templates. The template data defines information regarding the initial values of the type, the color, and the size of the font of text in the content and information regarding a figure (an object) or an image (e.g., layout information for placing the object) as information regarding the editing of the content.

According to a command from the application control unit 201, the template management unit 205 then reads the template data and returns data for editing the content to the application control unit 201.

The content management unit 206 manages a content handled by the content generation application 16. In a case where the user creates a desired content by editing a template, the content management unit 206 saves the content, or reads saved data and returns the content to the application control unit 201.

A start processing unit 207 executes processing when the content generation application 16 is started. If the content generation application 16 is started according to a start command from another application or an OS, the start processing unit 207 acquires information in the start command and returns the information to the application control unit 201, thereby performing control when the content generation application 16 is started.

Figure 10:
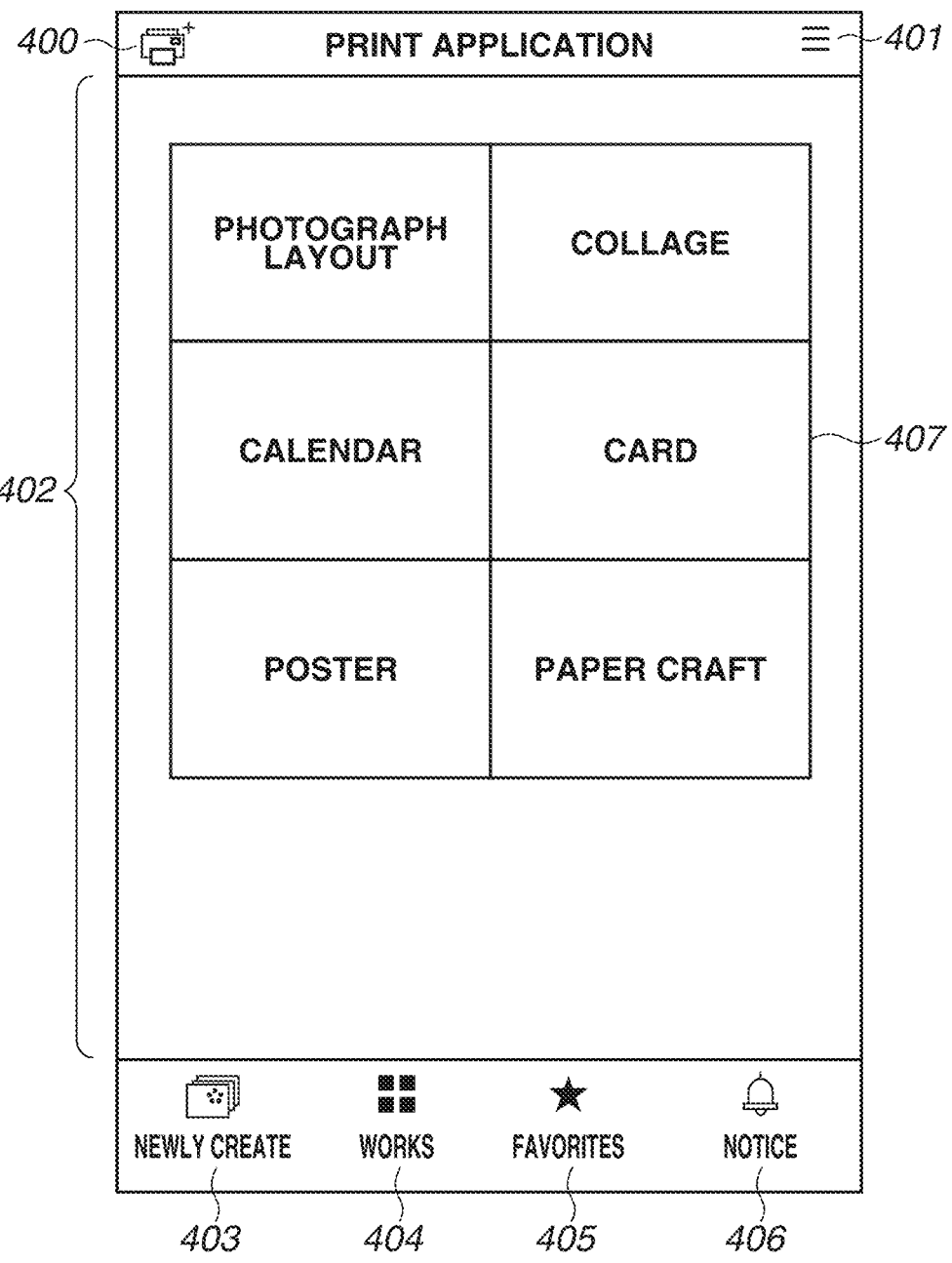
FIG. 10 is a diagram illustrating a main screen of the content editing application according to the first embodiment.

FIG. 10 is a diagram illustrating a main screen of the content generation application 16 according to the present embodiment. The screen illustrated in FIG. 10 displays a printer registration button 400, a menu button 401, a main display region 402, a newly create button 403, a works display button 404, a favorites display button 405, and a notice display button 406.

If any of the buttons 403 to 406 is tapped, contents according to the tapped button are displayed in the main display region 402. FIG. 10 illustrates an example of display in the main display region 402 in a case where the content generation application 16 is started or in a case where the newly create button 403 for newly creating print data is tapped.

If the printer registration button 400 is tapped, a printer registration screen (not illustrated) is displayed. A printer to which a print job is to be transmitted is selected and set by a registration process through the printer registration screen. If the menu button 401 is tapped, various pieces of information regarding the content generation application 16, such as version information and license information, are displayed.

The main screen illustrated in FIG. 10 displays a plurality of category selection buttons 407 in the main display region 402. The category selection buttons 407 correspond to the categories of works that can be printed by the content generation application 16 according to the present embodiment. Although text such as "calendar" and "card" is displayed as the category selection buttons 407 in FIG. 10, icons corresponding to the respective categories may also be displayed with the text. If any of the category selection buttons 407 is tapped, the display target of the display 6 transitions to a screen for printing a content of the category corresponding to the tapped category selection button 407. Specifically, for example, if the category selection button 407 indicating "paper craft" is tapped, the display target of the display 6 transitions to a screen for creating a paper craft. Similarly, if the category selection button 407 indicating "calendar" is tapped, the display target of the display 6 transitions to a screen for creating a calendar. In FIG. 10, the category selection buttons 407 indicated as "calendar" and "card" are included. If any of these category selection buttons 407 is selected, a function for executing printing using a content is executed. The "content" may be image data itself as a printing target, or may be a template in which other image data is placed. In the present embodiment, the content is acquired from a content management server 101. However, there may be a content held in advance in the content generation application 16. According to the category selection button 407 tapped by the user, a content that can be used in printing and the presence or absence of an editing function, such as the insertion of an image or the insertion of text into a content, differ. In the present embodiment, the categories that can be selected using the category selection buttons 407 include a category including a content to be assembled after printing. In the present embodiment, the category including the content to be assembled after printing is "paper craft". In the present embodiment, "assembly" refers to the process of cutting, bending, or bonding print products, thereby processing the print products and creating a work. Thus, in the present embodiment, the content to be assembled after printing includes assistance image regions for assisting and guiding assembly (processing) by the user, such as a line indicating a cutting position, a line indicating a bending position, and a margin. A print product obtained by printing a single content is not limited to a single print product, and may be a plurality of print products. For example, in the case of a content for creating a work by combining a plurality of parts, it is necessary to obtain print products corresponding to the plurality of parts. Thus, a plurality of print products is obtained by printing a single content. In the present embodiment, control is executed in consideration of the time taken to produce a work. It is naturally considered that the greater the number of parts used to produce the work is, the longer the time taken to produce the work is.

If the works display button 404 illustrated in FIG. 10 is tapped, a list of thumbnails of works saved by the user is displayed as icons in the main display region 402. The works saved by the user are pieces of image data as printing targets created by the user selecting any of the category selection buttons 407. In the display of the list, the thumbnails may be displayed by distinguishing the works according to the categories corresponding to the category selection buttons 407.

If the favorites display button 405 is tapped, a screen indicating a list of contents registered as favorites by the user is displayed in the main display region 402. If the notice display button 406 is tapped, notification information, such as a notification of an update of a content, is displayed in the main display region 402.

Next, a description will be given of an example of display in a case where any of the category selection buttons 407 is tapped. If any of the category selection buttons 407 is tapped, the display target of the display 6 transitions to a content selection screen that displays a list of contents corresponding to the selected category.

Figure 11:
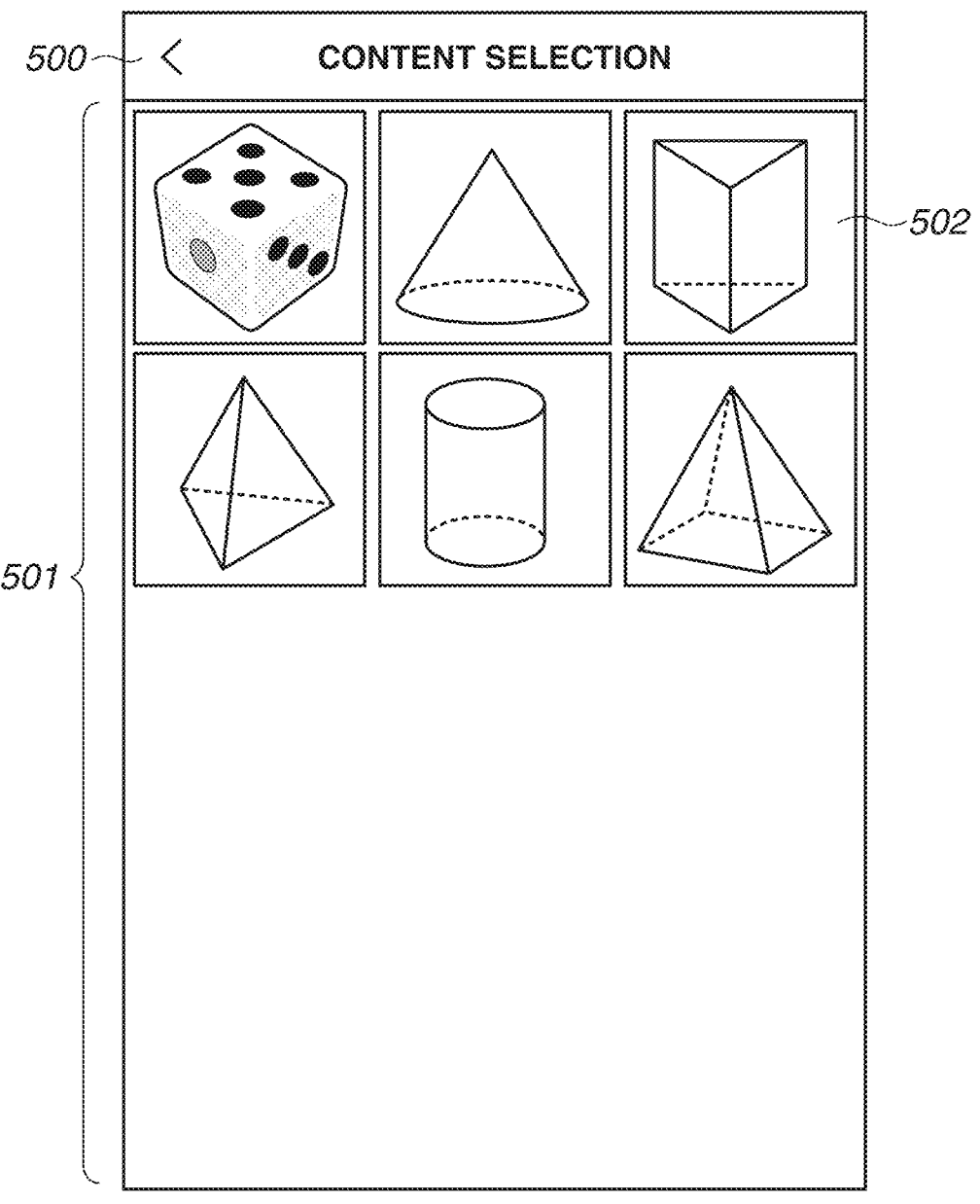
FIG. 11 is a diagram illustrating a content selection screen according to the first embodiment.

FIG. 11 is a diagram illustrating a content selection screen corresponding to "paper craft". The content selection screen includes a return button 500 and a content thumbnail display region 501. If the return button 500 is tapped, the display target of the display 6 transitions to the screen (the screen in FIG. 10) before the transition to this screen. In the content thumbnail display region 501, a plurality of content thumbnails 502 is displayed. A content thumbnail 502 is a region where a content corresponding to each category is displayed as a thumbnail. Particularly, the content thumbnails 502 corresponding to "paper craft" are regions where craftworks to be obtained by assembling print products obtained by printing the contents corresponding to "paper craft" are displayed as thumbnails. A content thumbnail 502 corresponding to a content other than "paper craft" (a content that does not require the assembly of print products) may be a region where the content itself is displayed as a thumbnail. If any of the content thumbnails 502 is tapped (selected), the display target of the display 6 transitions to a content details screen indicating the details of the selected content thumbnail 502.

Figure 12:
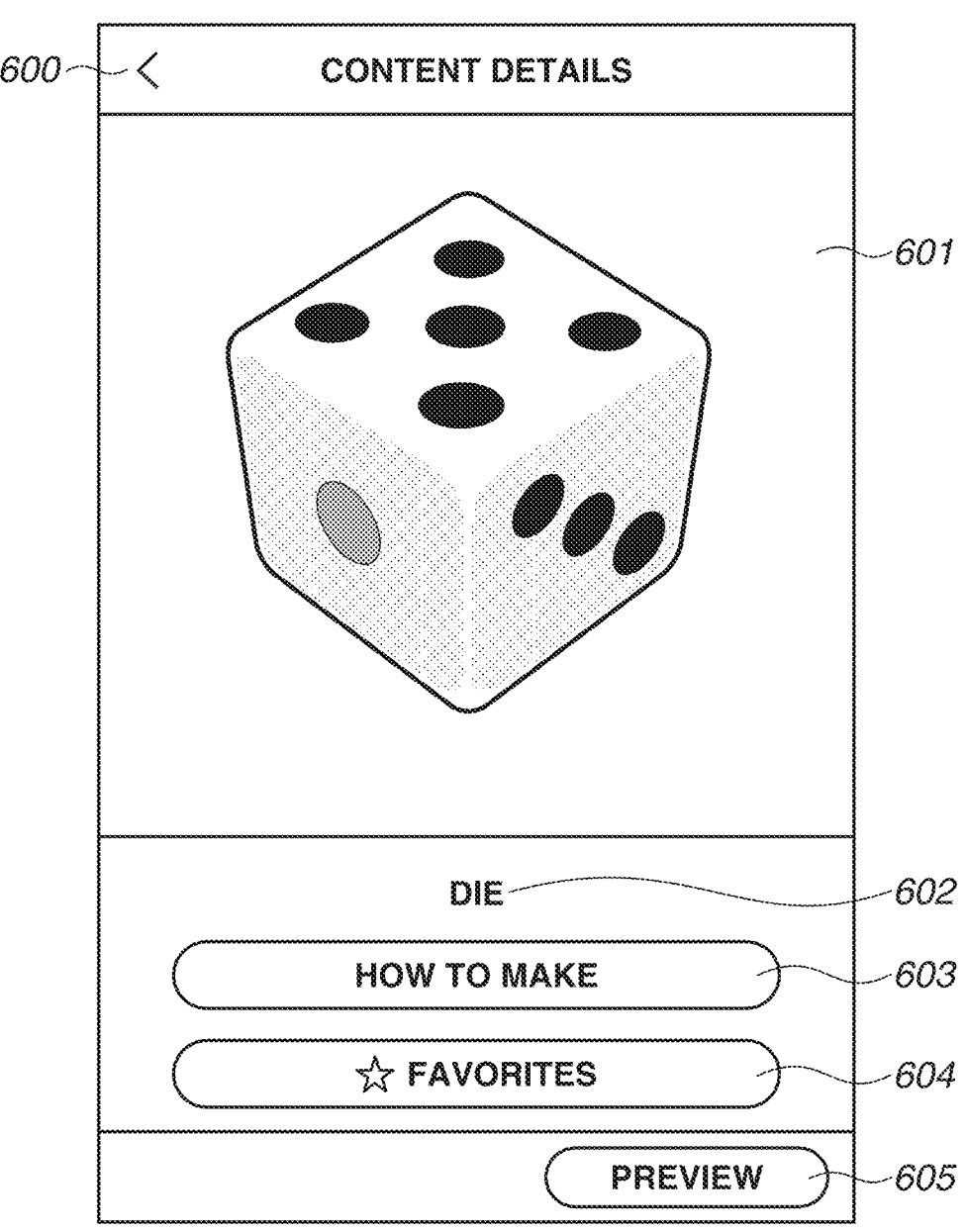
FIG. 12 is a diagram illustrating a content details screen according to the first embodiment.

FIG. 12 is a diagram illustrating the content details screen. The content details screen includes a return button 600, a content details 601, a content name 602, a content creation method display button 603, a favorites button 604, and a preview button 605. If the content corresponding to the content details screen is a content on which an editing operation, such as the insertion of an image or the insertion of a character, can be executed, the preview button 605 changes to an edit button. If the return button 600 is tapped, the display target of the display 6 transitions to the screen (the screen in FIG. 11) before the transition to this screen. If the content creation method display button 603 is tapped, a print app downloads a file indicating a craftwork creation method from the content management server 101 and displays a screen indicating the craftwork creation method (not illustrated) by using the file. The "craftwork creation method" refers to a method for assembling print products on which the content corresponding to the content details screen is printed. The user can create the craftwork by assembling the print products according to this method. A form may be employed in which the file indicating the craftwork creation method is not downloaded from the external server, but is included in advance in the content generation application 16. The content creation method display button 603 is displayed only on a content details screen regarding a content to be assembled. In the present embodiment, the content creation method display button 603 is displayed only on content details screens regarding the contents of the category "paper craft", and is not displayed on content details screens regarding the contents of the categories other than "paper craft".

If the favorites button 604 is tapped, the content corresponding to the currently displayed content details screen is registered as a favorite. The content registered as a favorite is indicated on a screen displayed by tapping the favorites display button 405. If the preview button 605 is tapped, the display target of the display 6 transitions to a preview screen indicating a print product (a print result) to be obtained in a case where the content corresponding to the content details screen is printed. In the present embodiment, if the content selected on the content selection screen is a content held in the content management server 101, the content generation application 16 downloads the content based on the tapping of the preview button 605 (or the edit button). The content generation application 16 then displays a preview screen corresponding to the content, based on the downloaded content. The present disclosure is not limited to this form. Based on the selection of the content on the content selection screen, the content generation application 16 may download the content before the content details screen is displayed (or while the content details screen is displayed). If the content selected on the content selection screen is a content held in advance in the content generation application 16, the content generation application 16 displays a preview screen based on the content held in advance without downloading the content from the external server.

Figure 3:
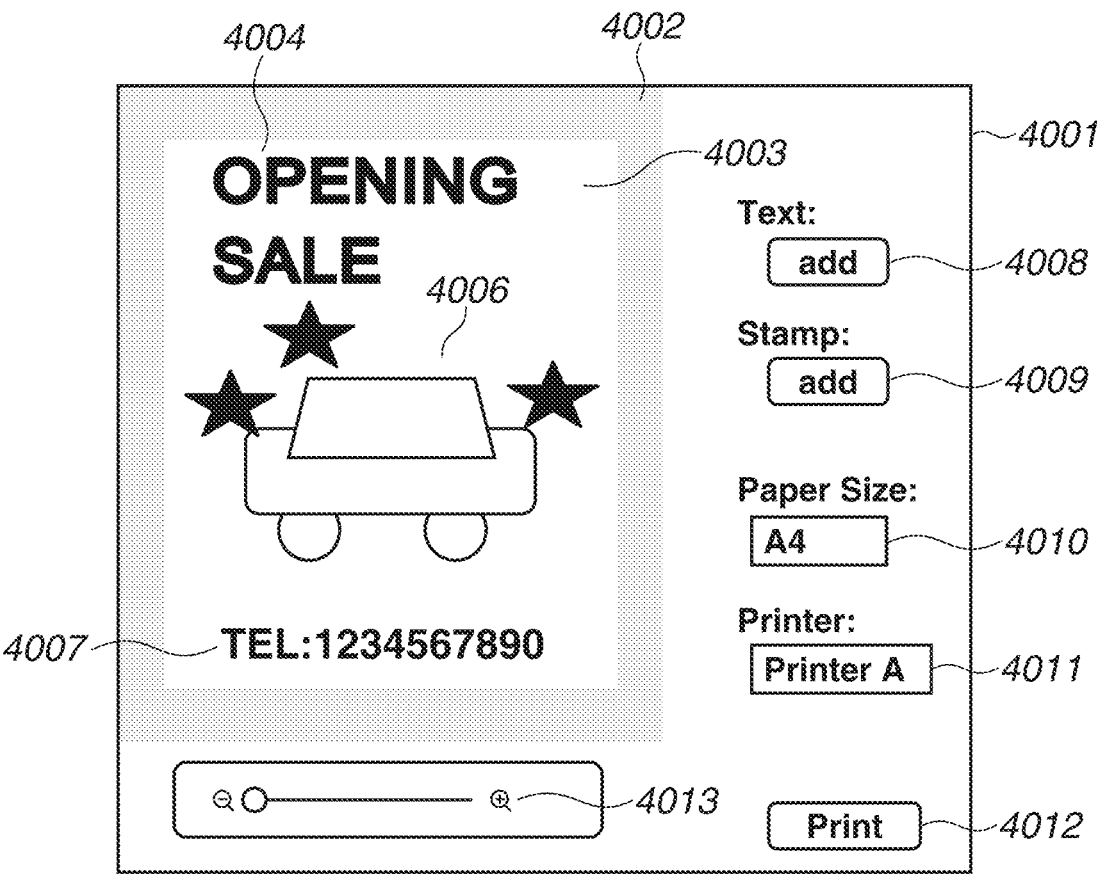
FIG. 3 is a diagram illustrating an example of a screen configuration of a content editing application according to the first embodiment.

FIG. 3 is a diagram illustrating an example of the screen configuration of the content generation application 16 according to the first embodiment, and the red, green, and blue (RGB) values and the hue, saturation, and value (HSV) values of each of a content end portion color and a background color. These values will be described below.

If the preview button 605 is pressed on the content details screen in FIG. 12, the content generation application 16 displays a preview screen 4001 on the display 6. The preview screen 4001 includes a preview region 4002, a content 4003, a text addition region 4008, a graphic object addition region 4009, an output paper size selection region 4010, an output destination printer selection region 4011, a print region 4012, and preview display reduction/enlargement control 4013. Alternatively, a save button (not illustrated) may further be included. If the save button is tapped, the content corresponding to the currently displayed preview screen 4001 is saved. The saved content is indicated on a screen displayed by tapping the works display button 404.

The preview screen 4001 displays the regions 4008 to 4013 for editing and setting the displayed content 4003, but may not display the regions 4008 to 4013 if the displayed content 4003 is a content that cannot be edited.

The preview region 4002 is a region for displaying a preview of the content 4003. Even if the content 4003 is enlarged by an enlargement operation or reduced by a reduction operation, the range of the preview region 4002 does not change. For example, if the size of the content 4003 is larger than that of the preview region 4002 by enlarging the content 4003, a part of the content 4003 is not displayed (is cut off). For example, if the size of the content 4003 is smaller than that of the preview region 4002 or the aspect ratios of the preview region 4002 and the content 4003 are different from each other by reducing the content 4003, a region where the content 4003 is not present occurs in the preview region 4002. This region is displayed in a background color having fixed RGB values.

The content 4003 is displayed inside the preview region 4002 and edited using the regions 4008 to 4012 and the region 4013. In FIG. 3, a poster regarding the opening of a store is displayed as the content 4003.

Objects 4004, 4006, and 4007 are objects placed in the content 4003. The objects 4004 and 4007 are text objects. The graphic object 4006 is a graphic object held in advance in the content generation application 16.

The text addition region 4008 is a region for adding a text object into the content 4003. If the text addition region 4008 is selected, a screen for inputting a text object is displayed, so that the user can input text using the keyboard 7. After the content of the input text is finalized, a text object is added into (placed in) the content 4003.

The graphic object addition region 4009 is a region for adding a graphic object into the content 4003. If the graphic object addition region 4009 is selected, graphic objects in the host computer 1 are displayed. The user selects one of the displayed graphic objects, whereby the graphic object is added into (placed in) the content 4003.

The output paper size selection region 4010 is a region for setting the paper size (the output paper size) in a case where the content 4003 is output. If the output paper size selection region 4010 is selected, a list of paper sizes that can be specified is displayed. If a single paper size is selected from the displayed list of paper sizes, the selected paper size is displayed as the output paper size. For example, FIG. 3 illustrates the state where an A4 size is selected.

The output destination printer selection region 4011 is a region for setting the printer 20 to execute printing. If the output destination printer selection region 4011 is selected, a list of printers 20 that can be used is displayed. If a single printer 20 is selected from the displayed list of printers 20, the selected printer 20 is displayed as the printer 20 to receive a print instruction. For example, FIG. 3 illustrates the state where a printer A is selected.

The print region 4012 is a region for starting printing. If the print region 4012 is selected, the content generation application 16 gives a print instruction to print the content 4003 with the paper size selected in the output paper size selection region 4010 to the printer 20 specified in the output destination printer selection region 4011.

The preview display reduction/enlargement control 4013 is a region for enlarging or reducing the content 4003. The content 4003 is enlarged or reduced according to a user operation on the preview display reduction/enlargement control 4013. The enlargement ratio can be adjusted between 0% and 100%. If the entirety of the content 4003 is displayed, the enlargement ratio is 0%. The content 4003 can be enlarged to an enlargement ratio of 100% by an enlargement operation.

The user creates the content 4003 based on template data designed in advance and held in the template management unit 205. If an editing operation is performed on the content 4003 in the process of creating the content 4003, the content management unit 206 displays the content 4003 that reflects the content of the editing. For example, an editing operation of adding or changing a text object, a graphic object, or an image can be performed on the content 4003.

However, in a case where the editing operation is performed on a region indicating an end portion of the content 4003 (hereinafter referred to as a "content end portion region"), and if the color of the end portion of the content 4003 (hereinafter referred to as a "content end portion color") and the color of a background (the preview region 4002) where the content 4003 is placed (hereinafter referred to as a "background color") are similar to each other, the visibility of the end portion of the content 4003 may be low, and the boundary between the content 4003 and the background may be hard to understand. This decreases the usability of the editing operation on the content 4003. Further, there is a possibility that the print result of printing the edited content 4003 is not the print result desired by the user.

As a method for determining whether the visibility is low, a general technique is used. For example, "Techniques For Accessibility Evaluation And Repair Tools" published by the World Wide Web Consortium (W3C) is used. This determination method converts RGB values as a representation of a color into HSV values, and if the difference between the values of at least one of the components of the HSV values is less than or equal to a predetermined threshold (or lower than the predetermined threshold), determines that the visibility is low. The HSV values are values representing a color space. H is hue representing tint, S is saturation (or chroma) representing the vividness of the color, and V is luminance or value (or brightness) representing the brightness of the color. The predetermined threshold may be different or the same with respect to each of the components of the HSV values.

That is, more specifically, "the determination of whether the visibility is low" refers to the determination of whether the difference between the values of at least one of the components of the HSV values of the content end portion color and the background color is less than or equal to the predetermined threshold.

For example, in the content 4003 in FIG. 3, the RGB values of the color of the region of the end portion of the content 4003 other than the text objects 4004 and 4007 and the graphic object 4006 are RGB (255, 255, 235). In contrast, the RGB values of the color of the preview region 4002 as a default background color are RGB (254, 252, 244). If the RGB values of the color of the content end portion region and the color of the preview region 4002 are converted into HSV values, the HSV values of the color of the content end portion region are HSV (60, 7, 100), and the HSV values of the color of the preview region 4002 are HSV (48, 4, 100). RGB (254, 252, 244) as the RGB values of the default background color are fixed values. Thus, for example, if the predetermined threshold for determining that the visibility is low is 20, it is determined that the visibility of the content end portion region in FIG. 3 is low because each of the differences between the values of the components of the HSV values of the content end portion region, and the HSV values of the default background color is less than or equal to the predetermined threshold. Instead of determining that the visibility is low in a case where the difference between the values of at least one of the components of the HSV values is less than or equal to the predetermined threshold, it may be determined that the visibility is low in a case where the differences between the values of all the components of the HSV values are less than or equal to the predetermined threshold.

To make the boundary between the content 4003 and the background easy to understand, it is also possible to perform editing for applying a color different from the default background color to the content end portion region. In this case, however, there is a low possibility that the content 4003 desired by the user can be created.

In the present embodiment, if it is determined that the visibility of the content end portion region is low, the content generation application 16 thus changes the default background color to a background color that heightens the visibility of the content end portion region. That is, the background color is changed such that the difference between information regarding the background color and information regarding the content end portion color becomes greater than the predetermined threshold (or greater than or equal to the predetermined threshold). More specifically, the background color is changed such that at least one of the differences between the values regarding the hue, the saturation, and the luminance of the content end portion region and the values regarding the hue, the saturation, and the luminance of the background color has a value greater than the predetermined threshold. Consequently, there is a low possibility that the boundary between the content 4003 and the background is hard to understand because the visibility of the content end portion region is low. It is thus possible to improve the usability of the editing operation on the content 4003. It is also possible to reduce the possibility that the print result of printing the edited content 4003 is not the print result desired by the user. It is also possible to increase the possibility that the content 4003 desired by the user is created not by changing the color of the end portion of the content 4003 but by changing the background color.

A background color change process by the content generation application 16 will now be described.

Figure 4:
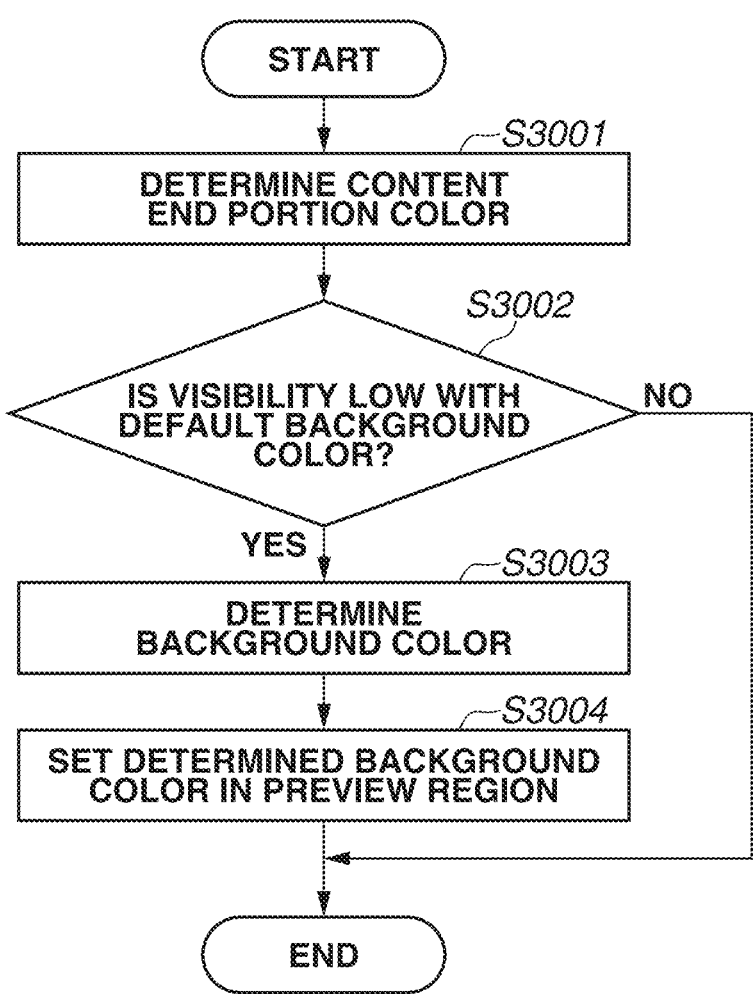
FIG. 4 is a flowchart of a background color change process according to the first embodiment.

FIG. 4 is a flowchart illustrating a background color change process performed by the content generation application 16 according to the first embodiment.

When the content generation application 16 is started by the user and the preview screen 4001 is displayed based on an instruction to display the preview screen 4001, the processing of this flowchart is started.

Figure 5:
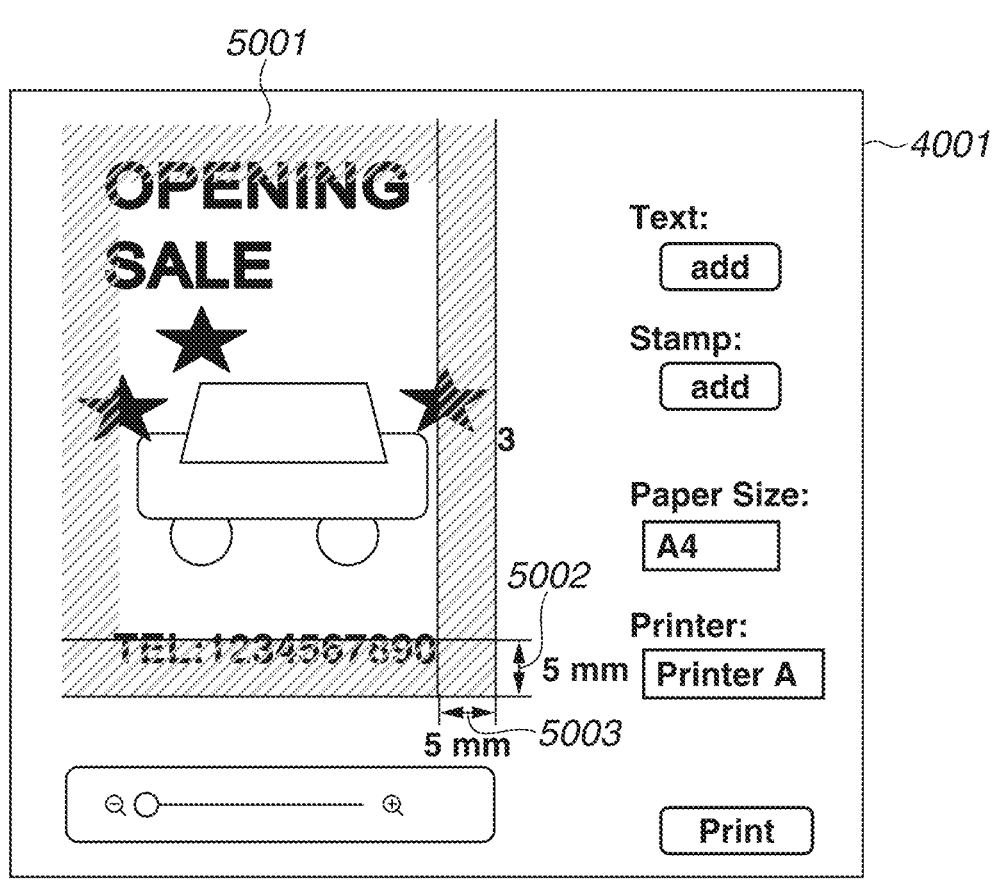
FIG. 5 is a diagram illustrating a content end portion region according to the first embodiment.

In step S3001, the content generation application 16 determines the content end portion color. The process of step S3001 will be specifically described with reference to FIG. 5. FIG. 5 is a diagram illustrating the content end portion region according to the first embodiment.

In FIG. 5, a content end portion region 5001 is a region from each of vertical and horizontal sides as boundary sides between the preview region 4002 and the content 4003 to a predetermined length inside the content 4003. In the example of FIG. 5, a portion of the content end portion region 5001 on each short side as one of the boundary sides is a region from the short side of the content 4003 to a predetermined length (a vertical width 5002) inside the content 4003 in the vertical direction.

A portion of the content end portion region 5001 on each long side as one of the boundary sides is a region from the long side as one of the boundary sides to a predetermined length (a horizontal width 5003) inside the content 4003 in the horizontal direction. In the present embodiment, with respect to the A4 paper size, each of the vertical width 5002 and the horizontal width 5003 of the content end portion region 5001 is a width of 5 mm. Each of the widths of the content end portion region 5001, however, is not limited to 5 mm, and may have a predetermined length. Alternatively, the vertical width 5002 and the horizontal width 5003 may be widths having different lengths.

In the process of determining the content end portion color, the distribution of pixels in the content end portion region 5001 is obtained. For example, if a text object or a graphic object is not placed in the content end portion region 5001, pixels with RGB (255, 255, 255) (white) are 100% in the color distribution of the content end portion region 5001. In contrast, as illustrated in the example of FIG. 5, if a text object or a graphic object is included in the content end portion region 5001, pixels with RGB (255, 255, 255) are not 100% in the color distribution of the content end portion region 5001. This is because pixels with RGB values different from the RGB values of the region where an object is not placed are included by an amount corresponding to the area of the text object or the graphic object. In the present embodiment, the most-used pixel color is determined as the content end portion color. For example, in FIG. 5, if the region where an object is not placed in the content 4003 is white, it is determined that the region where the text object or the graphic object is placed is smaller than the region where an object is not placed in the content 4003. Thus, the content end portion color is determined as white. The method for determining the content end portion color is not limited. If a text object or a graphic object is included in the content end portion region 5001, then in the content end portion region 5001, a color obtained by mixing the color of the pixels of the region where each object is placed and the color of the pixels of the region where an object is not placed in proportions according to the sizes of the respective regions may be determined as the content end portion color.

In the present embodiment, the content end portion color is assumed to be RGB (255, 255, 235) illustrated in FIG. 3.

If the editing operation performed on the content 4003 by the user is an operation influencing the content end portion region 5001, the content end portion color is changed as needed.

That is, the process of acquiring and storing the editing operation on the content 4003, determining the content end portion color based on the operation influencing the content end portion region 5001, and displaying the content 4003 is repeated. For example, as the operation influencing the content end portion region 5001, the operation of placing, in the region where an object is not placed in the content end portion region 5001, an object having RGB values greatly different from the RGB values of the region where an object is not placed is possible. If the object placed by this operation occupies a large area of the content end portion region 5001, the color of the RGB values of the placed object is determined as the content end portion color. It is not essential to repeat the process of storing the editing operation on the content 4003, determining the content end portion color based on the operation influencing the content end portion region 5001, and displaying the content 4003. That is, a configuration may also be employed in which the determination of whether the visibility is low is made based on the end portion color of the content 4003 in a case where the preview region 4002 is displayed first and the default background color, and the background color is determined.

In step S3002, the content generation application 16 compares the content end portion color determined in step S3001 and the default background color to determine whether the visibility of the end portion of the content 4003 is low. Specifically, the above method for determining whether the visibility is low is used. If it is determined that the visibility is low (YES in step S3002), the processing proceeds to step S3003. If it is determined that the visibility is not low (NO in step S3002), it is considered that the boundary between the content 4003 and the preview region 4002 can be sufficiently recognized. Thus, the processing of this flowchart ends. If the content end portion color and the color of a region other than the content end portion region in the content 4003 are the same color, the color of the region other than the content end portion region in the content 4003 may be used instead of the content end portion color in this determination process.

In step S3003, the content generation application 16 determines the background color (the color of the preview region 4002). That is, the content generation application 16 determines a background color having RGB values different from those of the default background color to heighten the visibility of the content end portion color and the background color. As described above, if the differences between the HSV values of the content end portion color and the HSV values of the color of the preview region 4002 are less than or equal to the predetermined threshold, it is determined that the visibility of the background color is low. Thus, a color having HSV values with which the differences between the HSV values of the content end portion color and the HSV values of the color of the preview region 4002 are greater than the predetermined threshold is determined as the background color.

In the state where it is determined that the differences between the HSV values of the content end portion color and the HSV values of the color of the preview region 4002 are less than or equal to the predetermined threshold, a color having HSV values with which the difference between the values of at least one of the components (H, S, and V) of the HSV values is greater than the predetermined threshold is determined as the background color. However, a color having HSV values with which all the values of the differences between the values of the components (H, S, and V) of the HSV values of the content end portion color and the HSV values of the color of the preview region 4002 are greater than the predetermined threshold may be determined as the background color. Further, in the state where it is determined that the differences between the HSV values of the content end portion color and the HSV values of the color of the preview region 4002 are less than or equal to the predetermined threshold, and if a color having HSV values with which the difference between the values of at least one of the components (H, S, and V) of the HSV values is greater than the predetermined threshold is determined as the background color, priorities may be set for the determinations of the components. For example, the following determination method is possible. First, the content generation application 16 determines whether the difference between the values of the luminance or the brightness (V) is less than or equal to the predetermined threshold. If it is determined that the difference is less than or equal to the predetermined threshold, the content generation application 16 determines whether the difference between the values of the hue (H) is less than or equal to the predetermined threshold.

If it is determined that the difference between the values of the hue (H) is less than or equal to the predetermined threshold (if it is determined that the difference between the values of V and the difference between the values of H are less than or equal to the predetermined threshold), the content generation application 16 determines a color having values with which the difference between the values of the hue (H) is greater than the predetermined threshold as the background color. If it is determined that the difference between the values of the hue (H) is greater than or equal to the predetermined threshold (if it is determined that the difference between the values of V is less than or equal to the predetermined threshold and the difference between the values of H is greater than or equal to the predetermined threshold), the content generation application 16 determines a color having values with which the difference between the values of the saturation (S) is greater than the predetermined threshold as the background color. The priorities of the components are not limited to these, and may be different.

Figures 6A, 6B:
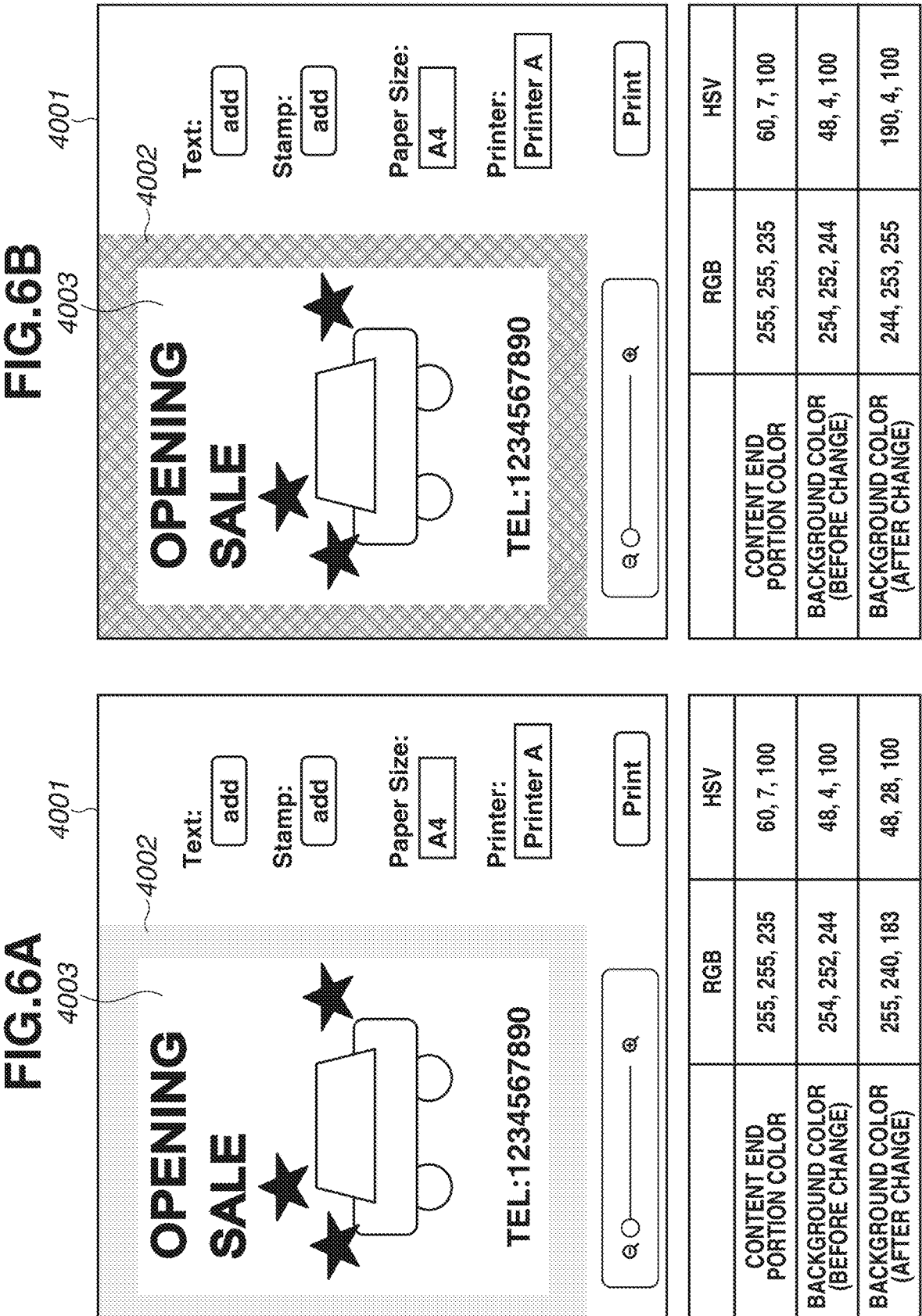
FIGS. 6A to 6F are diagrams illustrating examples of the screen configuration of the content editing application in a case where the background color change process according to the first embodiment is executed.

Such a process will be specifically described with reference to FIGS. 6A and 6B. FIGS. 6A and 6B are diagrams illustrating examples of the screen configuration of a content editing application in a case where the background color change process is executed. Components of the preview screen 4001 are similar to those in FIG. 3.

FIGS. 6A and 6B illustrate preview regions 4002 in a case where the background color is changed in the background color change process, and the RGB values and the HSV values of each of the content end portion color, the background color before the change, and the background color after the change.

In FIG. 6A, the color of the preview region 4002 is changed from RGB (254, 252, 244) (HSV (48, 4, 100)) to RGB (255, 240, 183) (HSV (48, 28, 100)). That is, in step S3003, the content generation application 16 determines a color obtained by increasing the value of the saturation (S) regarding the color of the preview region 4002 by 24 as the background color after the change. The visibility of the boundary between the content 4003 and the preview region 4002 is thereby heightened by making the saturation of the preview region 4002 different from the saturation of the content 4003.

In contrast, in FIG. 6B, the color of the preview region 4002 is changed from RGB (254, 252, 244) (HSV (48, 4, 100)) to RGB (244, 253, 255) (HSV (190, 4, 100)). That is, in step S3003, the content generation application 16 determines a color obtained by increasing the value of the hue (H) regarding the color of the preview region 4002 by 142 as the background color after the change. The visibility of the boundary between the content 4003 and the preview region 4002 is thereby heightened by making the hue of the preview region 4002 different from the hue of the content 4003. Although the preview region 4002 has an oblique line pattern to represent the difference in hue, this is merely a representation in the specification. The hue itself of the preview region 4002 changes from yellow to blue.

In step S3004, the content generation application 16 sets the background color determined in step S3003 in the preview region 4002 on an operation screen of the content generation application 16, and the processing of this flowchart ends. The preview region 4002 to which the set background color is applied is thereby displayed on the preview screen 4001.

Figure 6C:
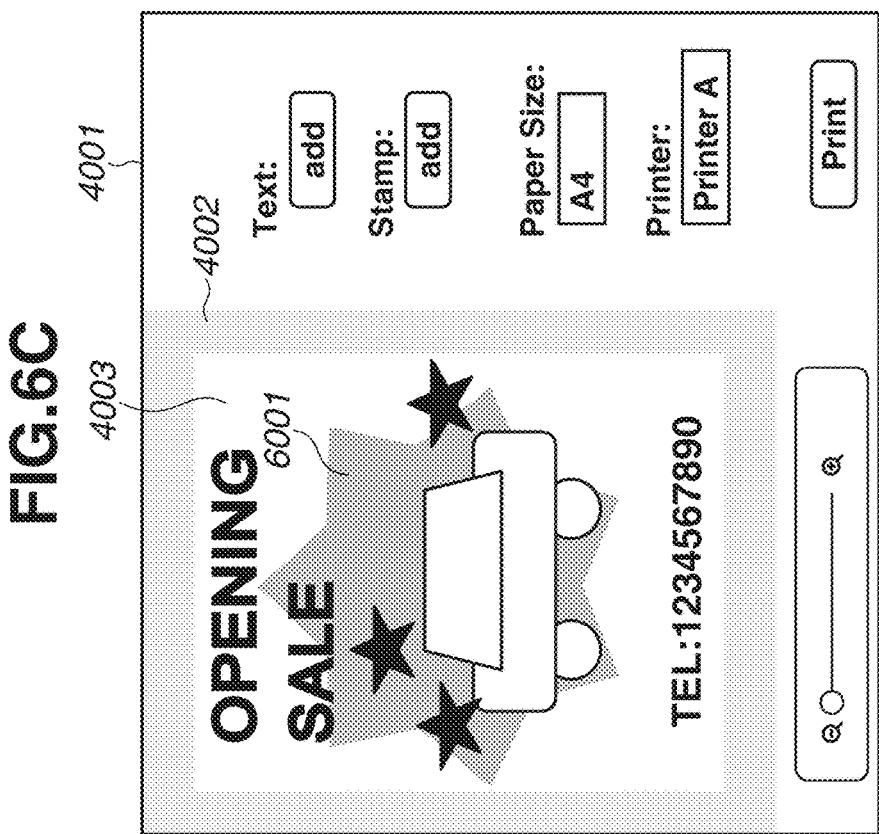
Figure 6D:
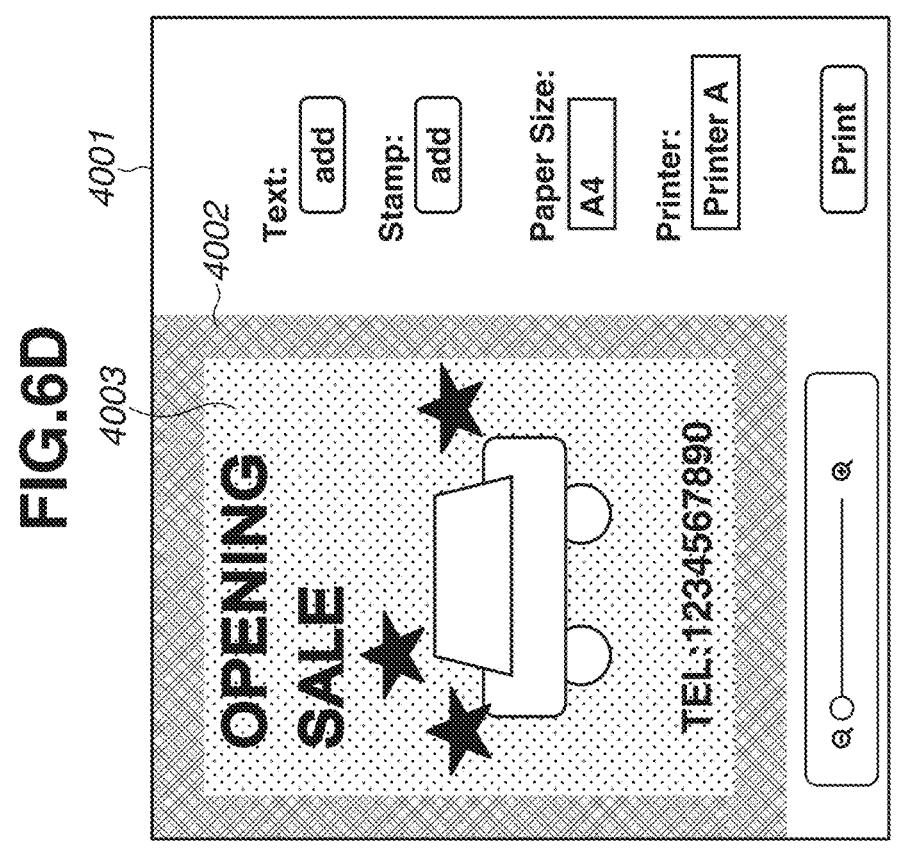
Figure 6F:
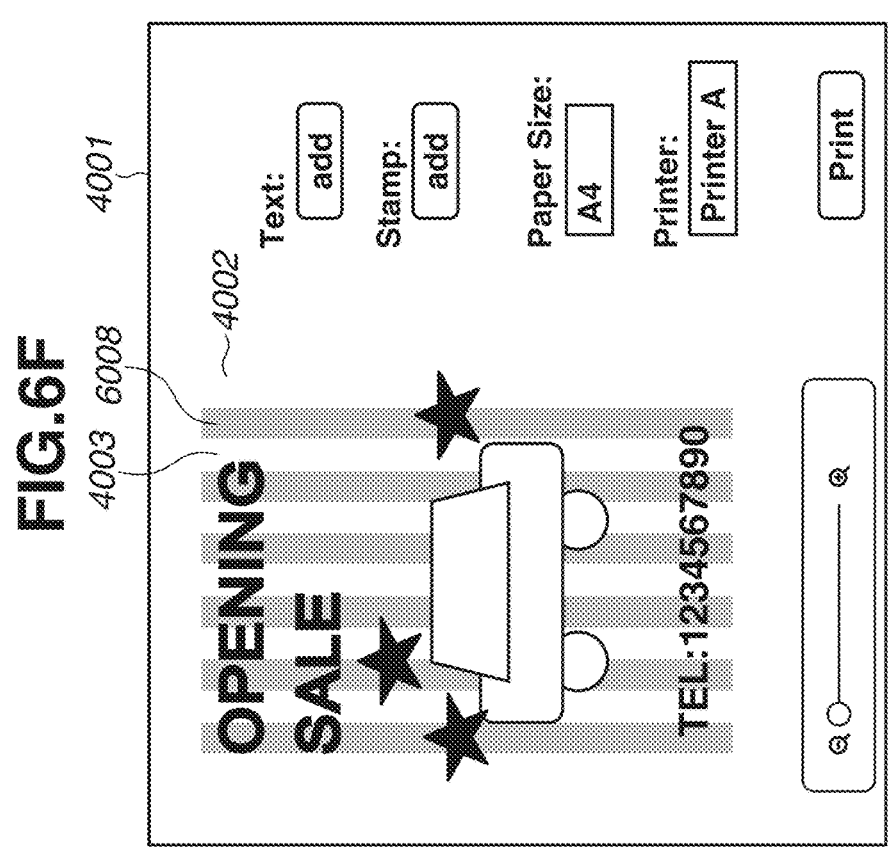
Figure 6E:
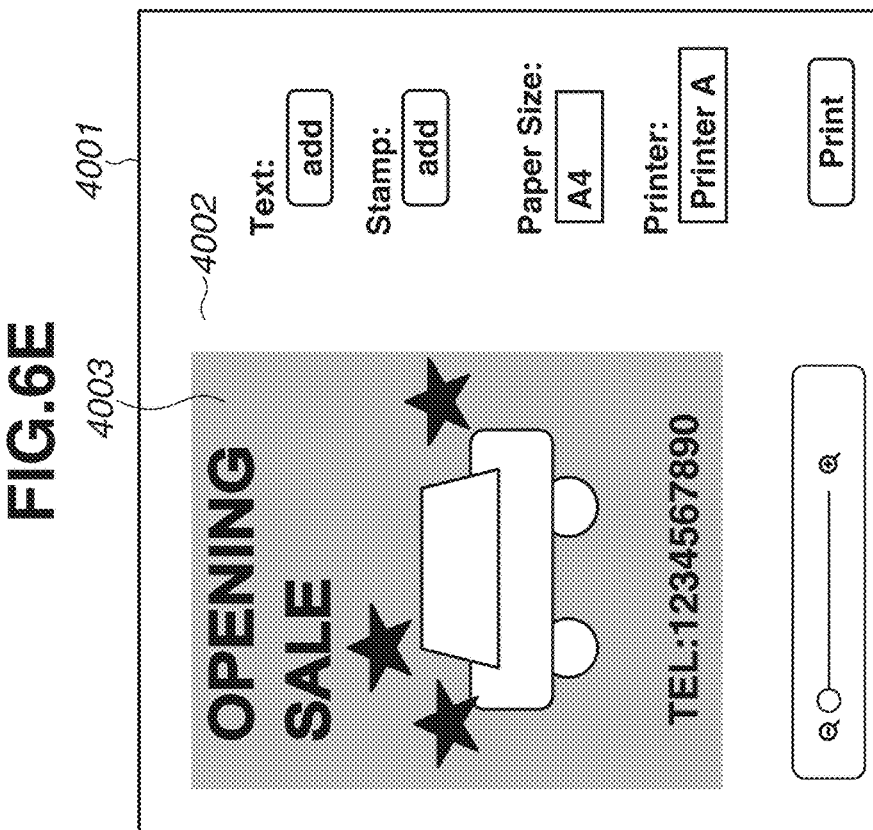

FIGS. 6C to 6F illustrate preview regions 4002 as examples of a case where the flowchart of the background color change process in FIG. 4 is executed. FIGS. 6C and 6D illustrate examples of a case where it is determined that the visibility is low in the background color change process, and the background color is changed. FIGS. 6E and 6F illustrate examples of a case where it is determined that the visibility is not low in the background color change process, and the background color is not changed.

FIG. 6C illustrates an example of a case where a large graphic object 6001 having a color different from the background color is present in the center of the content 4003. Since the graphic object 6001 present in the center is prominent, there is a strong impression that the color of the graphic object 6001 is the color of the entirety of the content 4003. If, however, attention is paid to the end portion region of the content 4003, the end portion region has a color similar to that of the preview region 4002. Thus, the visibility is heightened by changing the background color.

FIG. 6D illustrates an example of a case where small dots having a color different from the background color are placed in the entirety of the content 4003. Since the dots placed in the entirety are prominent, there is a strong impression that the color of the dot pattern is the color of the entirety of the content 4003. If, however, attention is paid to the end portion region of the content 4003, the end portion region has a color similar to that of the preview region 4002. Thus, the visibility is heightened by changing the background color.

FIG. 6E illustrates an example of a case where the entirety of the content 4003 has a color different from the background color.

In this case, the end portion color of the content 4003 is different from the background color, and the visibility of the boundary is high. Thus, the background color is not changed.

FIG. 6F illustrates an example of a case where belt-like objects 6008 having a color different from the background color are placed in the entirety of the content 4003. In this case, the belt-like objects 6008 having a color different from the background color in the end portion region of the content 4003 occupy a wide area, and therefore, the visibility of the boundary between the content 4003 and the background is high. Thus, the background color is not changed.

As described above, in the present embodiment, if it is determined that the visibility of the content end portion region is low, the content generation application 16 changes the default background color to a background color that heightens the visibility of the content end portion region. Consequently, there is a low possibility that the boundary between the content 4003 and the background is hard to understand because the visibility of the content end portion region is low. Thus, it is possible to improve the usability of the editing operation on the content 4003. It is also possible to reduce the possibility that the print result of printing the edited content 4003 is not the print result desired by the user. It is also possible to increase the possibility that the content 4003 desired by the user is created not by changing the color of the end portion of the content 4003 but by changing the background color.

In the first embodiment, a description has been given of the process of, if it is determined that the visibility of the content end portion region is low, changing the default background color to a background color that heightens the visibility of the content end portion region.

In a second embodiment, a description will be given of the process of, if it is determined that the visibility of the content end portion region is low, and a predetermined operation among editing operations on a content is executed, changing the default background color to a background color that heightens the visibility of the content end portion region.

The "predetermined operation" refers to, for example, an enlargement operation for displaying the content 4003 in an enlarged manner. As the enlargement operation, an operation on the reduction/enlargement control 4013 or a pinch-out operation on the content 4003 is possible. As the user's purpose of displaying the content 4003 in an enlarged manner, the following purpose is possible. For example, the user confirms the details of the content 4003, such as whether text in the content 4003 is placed at a correct position or a correct angle, whether a part of text overlaps another object, and whether text or an object is placed in the content 4003 without protruding from the content 4003. Thus, if the enlargement operation is performed, the process of heightening the visibility of the content 4003 (a background color change process) is executed, whereby it is possible to improve the usability of confirming the details. In contrast, it is possible that the purpose of displaying the entirety of the content 4003 (displaying the content 4003 at an enlargement/reduction ratio of 0%) as illustrated in the content 4003 in FIG. 3 is not to confirm the details, but to confirm an overview of the content 4003. Thus, if the entirety of the content 4003 is displayed by a reduction operation in the state where the content 4003 is displayed in an enlarged manner, the changed background color is returned to the default background color. Consequently, for example, the content 4003 is displayed in the default background where the background color is white as described above, whereby it is possible to easily imagine the print result. Thus, it is possible to improve the usability of confirming an overview of the content 4003. The background color is determined such that in a case where the enlargement/reduction ratio of the display of the entirety of the content 4003 is 0%, the greater the enlargement ratio is, the greater the differences between the HSV values of the content end portion color and the HSV values of the background color are. That is, the content 4003 is displayed such that if the enlargement operation is executed in a stepwise manner, the difference between the content end portion color and the background color also increases in a stepwise manner. As the reduction operation, an operation on the reduction/enlargement control 4013 or a pinch-in operation on the content 4003 is possible.

The "predetermined operation" refers to, for example, an editing operation of adding or editing an object. The object is, for example, a text object or a graphic object. As described above, the method for adding the text object or the graphic object is an operation on the text addition region 4008 or the graphic object addition region 4009. "Editing" refers to, for example, the input of a character to the text object, the deletion of a character from the text object, a change in the character color or the decoration, the movement or the rotation of the object, or the resizing of the object. In a case where the user adds or edits the object, it is possible that the user performs the editing operation while checking the details, such as whether the object is placed at an appropriate position in the content 4003 (e.g., whether the object is included within the content 4003). Thus, if the editing operation of adding or editing the object is performed, the process of heightening the visibility of the content 4003 (a background color change process) is executed, whereby it is possible to improve the usability of confirming the details.

Components and processes that are not mentioned in the following description are equivalent to those in the first embodiment, and therefore are not described.

Figure 7:
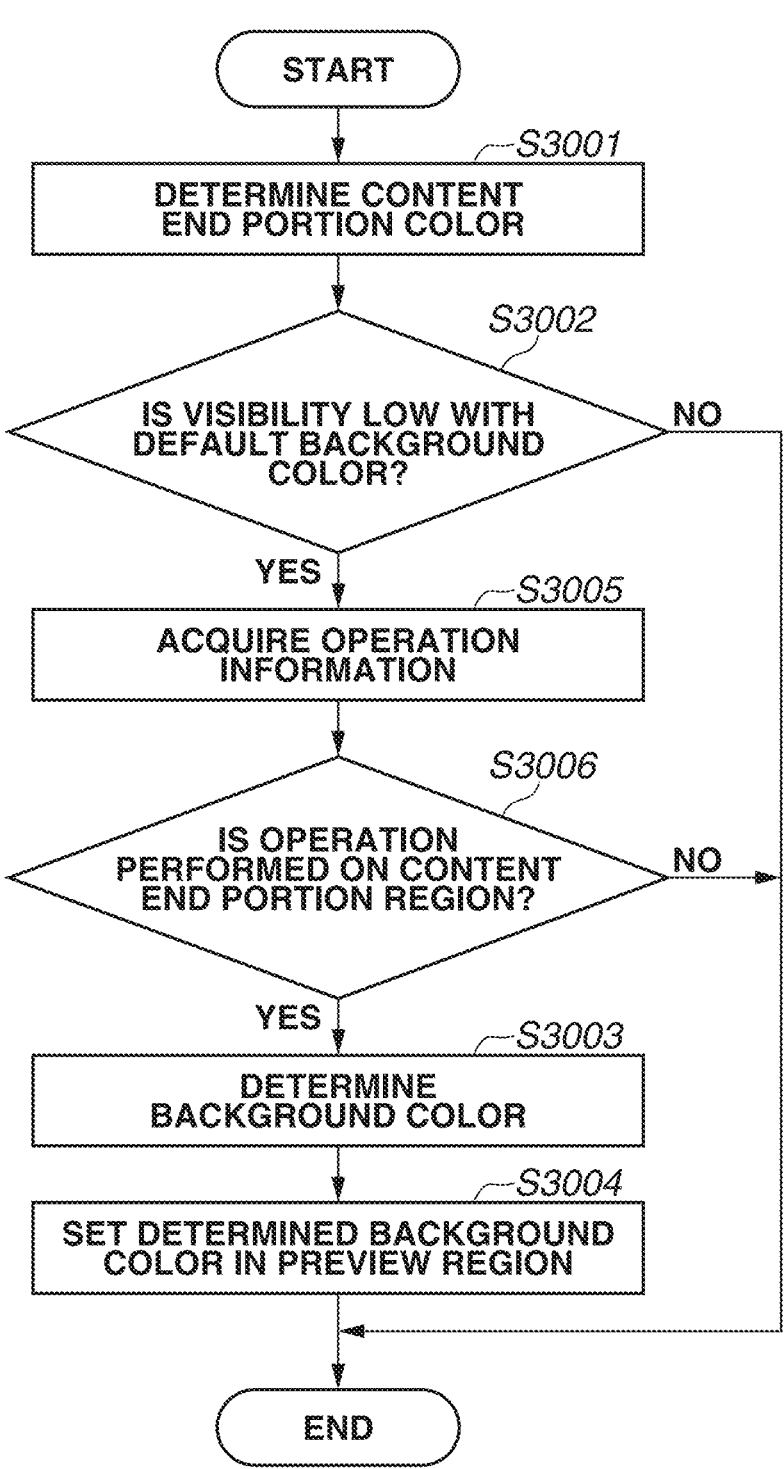
FIG. 7 is a flowchart of a background color change process according to a second embodiment.

FIG. 7 is a flowchart illustrating a background color change process performed by the content generation application 16 according to the second embodiment.

When the content generation application 16 is started by the user and the preview screen 4001 is displayed based on an instruction to display the preview screen 4001, the processing of this flowchart is started. Processes that are not mentioned in the description are processes similar to those in the flowchart illustrated in FIG. 4.

In step S3005, the content generation application 16 acquires predetermined operation information regarding the content 4003. The "predetermined operation information" refers to, for example, enlargement operation information regarding an enlargement operation on the content 4003 or reduction operation information regarding a reduction operation on the content 4003 (enlargement/reduction operation information), or editing operation information regarding an adding/editing operation on an object.

In step S3006, the content generation application 16 determines whether an operation is performed on the content 4003. Specifically, it is determined whether a user operation on the region 4008, 4009, or 4013 in FIG. 3 is performed. If it is determined that the operation is performed (YES in step S3006), the processing proceeds to step S3003. If it is determined that the operation is not performed (NO in step S3006), the processing of this flowchart ends.

In step S3003, the content generation application 16 determines the background color (the color of the preview region 4002). That is, the content generation application 16 determines a background color having RGB values different from those of the default background color in order to heighten the visibility of the content end portion color and the background color. As described above, if the differences between the HSV values of the content end portion color and the HSV values of the color of the preview region 4002 are less than or equal to the predetermined threshold, it is determined that the visibility of the background color is low. Thus, the content generation application 16 determines, as the background color, a color having HSV values with which the differences between the HSV values of the content end portion color and the HSV values of the color of the preview region 4002 are greater than the predetermined threshold.

Figure 8A:
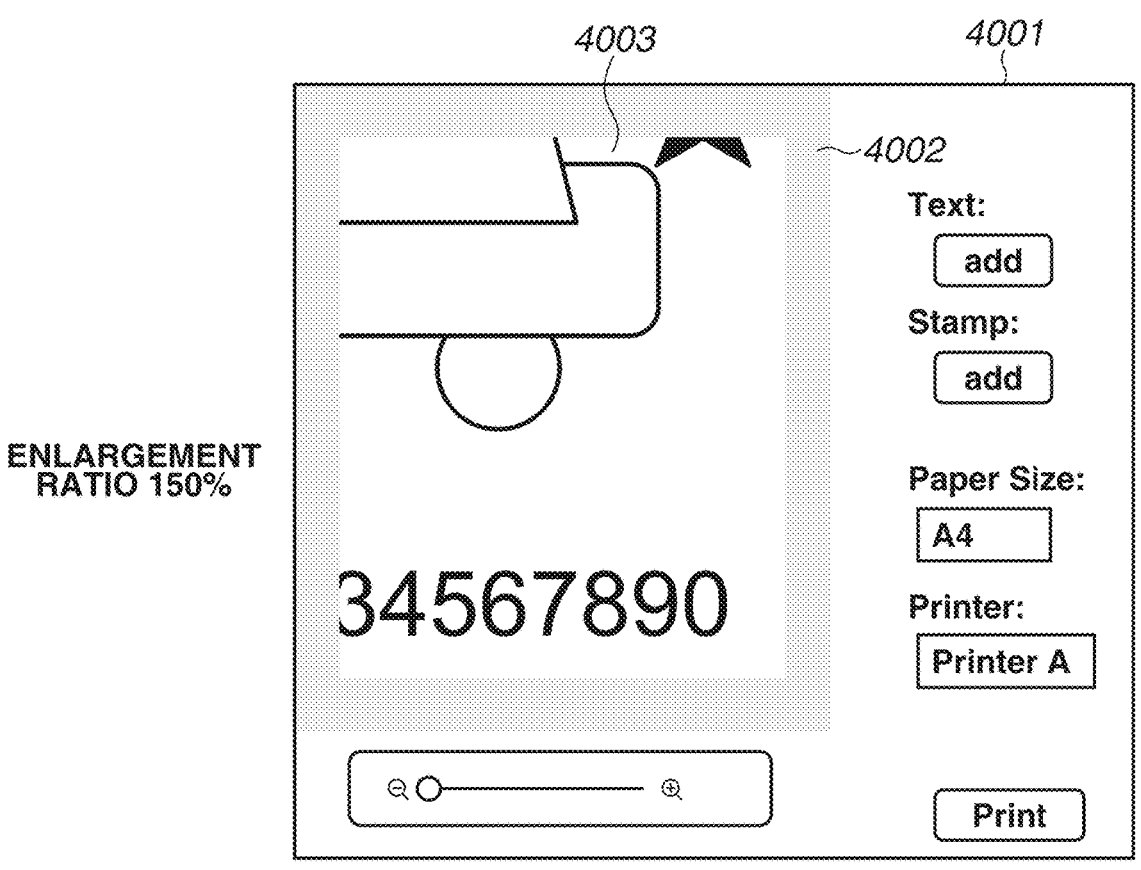
FIGS. 8A and 8B are diagrams illustrating examples of a screen configuration of a content editing application in a case where the background color change process is executed when an enlargement operation according to the first embodiment is performed.
Figure 8B:
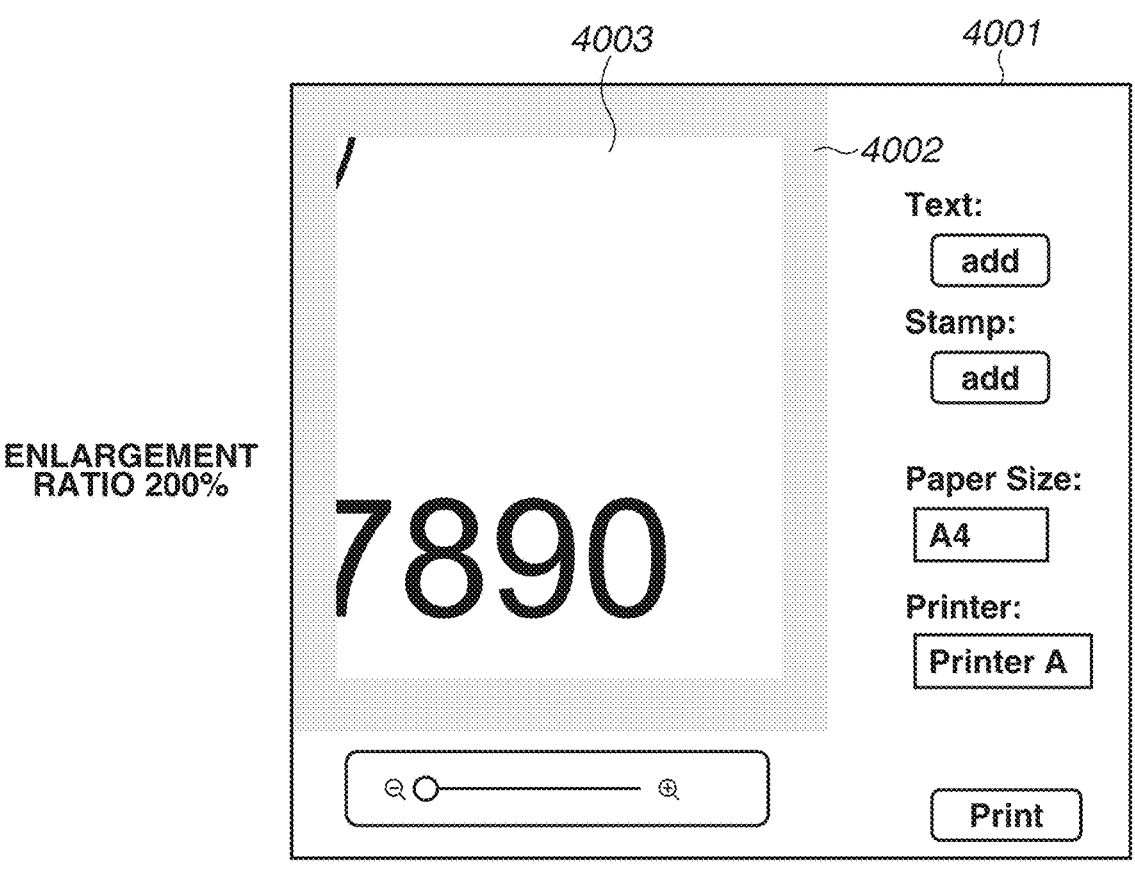

A case will be described where the enlargement operation information is acquired as the operation information in step S3005. FIGS. 8A and 8B are diagrams illustrating examples of the configuration of the preview screen 4001 displayed in a case where the enlargement operation is executed. Tables in FIGS. 8A and 8B illustrate the RGB values (the HSV values) of the background color when the background color is changed based on the predetermined operation.

FIG. 8A is a diagram illustrating the preview region 4002 where the content 4003 is displayed at an enlargement ratio of 150%.

In FIG. 8A, the values of the background color are changed from RGB (254, 252, 244) (HSV (48, 4, 100)) in a case where the enlargement operation is not performed in FIG. 3 to RGB (255, 240, 183) (HSV (48, 28, 100)). That is, in step S3003, the content generation application 16 determines a color obtained by increasing the value of the saturation (S) regarding the color of the preview region 4002 by 24, as the background color after the change.

FIG. 8B is a diagram illustrating the preview region 4002 where the content 4003 is displayed at an enlargement ratio of 200%.

In FIG. 8B, the values of the background color are changed from RGB (254, 252, 244) (HSV (48, 4, 100)) in a case where the enlargement operation is not performed in FIG. 3 to RGB (255, 228, 122) (HSV (48, 52, 100)). That is, in step S3003, the content generation application 16 determines a color obtained by increasing the value of the saturation (S) regarding the color of the preview region 4002 by 48, as the background color after the change.

The content 4003 is therefore displayed by determining the background color such that the differences between the HSV values of the content end portion color and the background color are greater in a case where the enlargement operation is performed at an enlargement ratio of 150% than in a case where the enlargement operation is not executed (in the case of an enlargement ratio of 0%). Further, the content 4003 is displayed by determining the background color such that the differences between the HSV values of the content end portion color and the background color are greater in a case where the enlargement operation is performed at an enlargement ratio of 200% than in a case where the enlargement operation is performed at an enlargement ratio of 150%. It is thereby understood that the greater the enlargement ratio is, the more improved the visibility is.

Figure 9A:
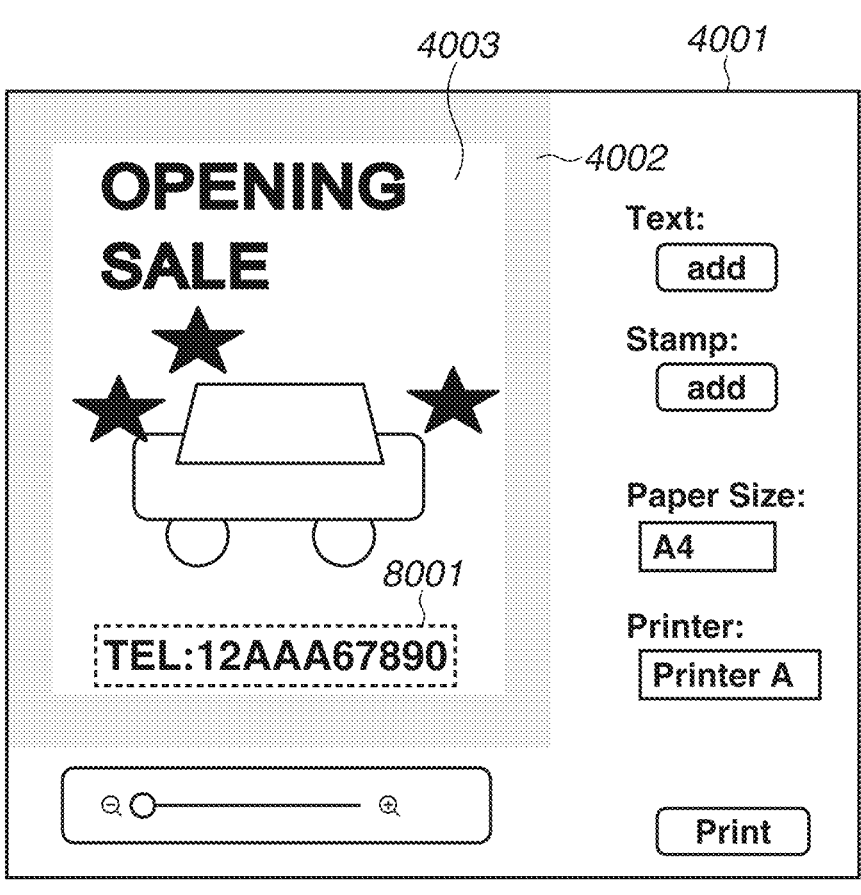
FIGS. 9A and 9B are diagrams illustrating examples of the screen configuration of the content editing application in a case where the background color change process is executed when a content editing operation according to the second embodiment is performed.
Figure 9B:
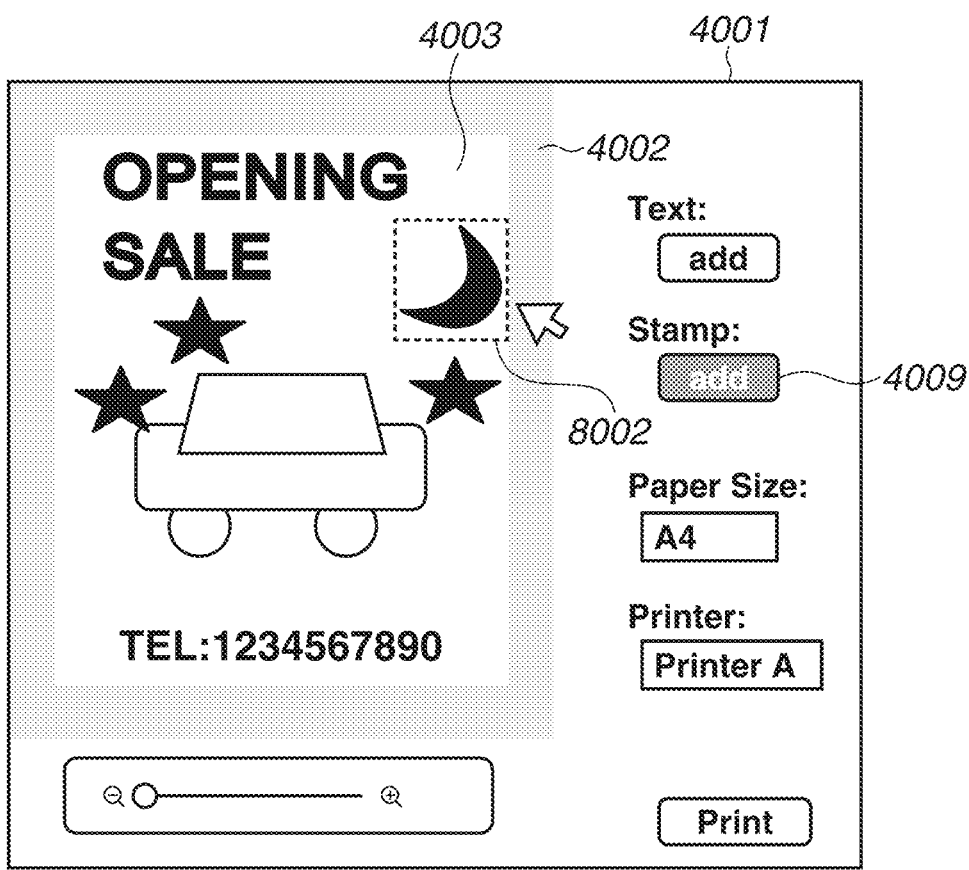

For example, a case will also be described where the editing operation information regarding the editing operation of adding or editing an object is acquired as the operation information in step S3005. FIGS. 9A and 9B are diagrams illustrating preview regions 4002 displayed in a case where the editing operation of adding or editing an object is executed. FIG. 9A is a diagram illustrating the state where a text object 8001 is placed in the content 4003. FIG. 9B is a diagram illustrating the state where a graphic object 8002 is placed in the content 4003 by pressing the graphic object addition region 4009 using the pointing device 8. A table in FIG. 9B illustrates the RGB values (the HSV values) of the background color when the background color is changed based on the predetermined operation. The values of the background color are changed from RGB (254, 252, 244) (HSV (48, 4, 100)) in a case where the enlargement operation is not performed in FIG. 3 to RGB (255, 240, 183) (HSV (48, 52, 100)). That is, in step S3003, the content generation application 16 determines a color obtained by increasing the value of the saturation (S) regarding the color of the preview region 4002 by 48 as the background color after the change. In the present embodiment, an example has been illustrated where the background color is not changed depending on the type of the predetermined operation. Alternatively, the background color may be changed depending on the type of the operation.

The content 4003 is therefore displayed by determining the background color such that the differences between the HSV values of the content end portion color and the background color are greater in a case where the editing operation is executed than in a case where the editing operation is not executed. It is thereby understood that the visibility is improved based on the execution of the editing operation.

The background color is changed based on the pressing of the region for adding an object, but may be changed based on the execution of any of the operations for editing an object (e.g., inputting a character to a text object, deleting a character from the text object, changing the character color or decoration, moving or rotating the object, and resizing the object).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-024843, filed Feb. 21, 2023, which is hereby incorporated by reference herein in its entirety.

What is claimed is:

1. A non-transitory computer-readable storage medium storing one or more programs including an application program for editing content, the one or more programs including instructions, which when executed by one or more processors of an information processing apparatus, cause the information processing apparatus to perform operations comprising:

converting a first set of values representing a first color of a predetermined region including the content to a second set of values representing the first color of the predetermined region;

converting a third set of values representing a color of the content to a fourth set of values representing the color of the content;

determining respective differences between each value of the second set of values and each corresponding value of the fourth set of values;

comparing the respective differences with a predetermined threshold; and based on a result of the comparison, changing the first color of the predetermined region to a second color different from the first color.

2. The non-transitory computer-readable storage medium according to claim 1, wherein the fourth set of values representing the color of the content is information regarding a color of a region of an end portion of the content, and wherein the operations further comprise determining the color of the region of the end portion of the content.

3. The non-transitory computer-readable storage medium according to claim 2, wherein the operations further comprise, based on the information regarding the color of the region of the end portion of the content and the second set of values representing the first color, determining whether visibility is low, and wherein, in a case where it is determined that the visibility is low, the operations further comprise changing the first color to the second color based on the information regarding the color of the region of the end portion of the content and the second set of values representing the first color.

4. The non-transitory computer-readable storage medium according to claim 3, wherein the case where it is determined that the visibility is low is a case where it is determined that a difference between the information regarding the color of the region of the end portion of the content and the second set of values representing the first color is less than or equal to a predetermined threshold.

5. The non-transitory computer-readable storage medium according to claim 3, wherein the case where it is determined that the visibility is low is a case where all of the differences between values regarding hue, saturation, and luminance of the region of the end portion of the content and values regarding hue, saturation, and luminance of the predetermined region is less than or equal to a predetermined threshold.

6. The non-transitory computer-readable storage medium according to claim 1, wherein the operations further comprise determining the second color.

7. The non-transitory computer-readable storage medium according to claim 6, wherein the program further causes the computer to execute setting the second color to a color of the predetermined region.

8. The non-transitory computer-readable storage medium according to claim 7, wherein the operations further comprise displaying the predetermined region which includes the content and in which the second color is set on a display unit of the information processing apparatus.

9. The non-transitory computer-readable storage medium according to claim 1, wherein the operations further comprise changing the first color to the second color so that a difference between information regarding a color of a region of an end portion of the content and information regarding the first color has a value greater than a predetermined threshold.

10. The non-transitory computer-readable storage medium according to claim 1, wherein the operations further comprise changing the first color to the second color so that at least one of differences between values regarding hue, saturation, and luminance of a region of an end portion of the content and values regarding hue, saturation, and luminance of the predetermined region has a value greater than a predetermined threshold.

11. The non-transitory computer-readable storage medium according to claim 1, wherein the operations further comprise changing the first color to the second color based on an editing operation on the content.

12. The non-transitory computer-readable storage medium according to claim 11, wherein the editing operation is an operation for enlarging the content.

13. The non-transitory computer-readable storage medium according to claim 11, wherein the editing operation is an operation for reducing an end portion of the content.

14. The non-transitory computer-readable storage medium according to claim 11, wherein the editing operation is an operation for adding an object to the content.

15. The non-transitory computer-readable storage medium according to claim 11, wherein the editing operation is an operation of placing an object in a region of an end portion of the content.

16. The non-transitory computer-readable storage medium according to claim 14, wherein the object is a text object.

17. The non-transitory computer-readable storage medium according to claim 14, wherein the object is a graphic object.

18. The non-transitory computer-readable storage medium according to claim 1, wherein the operations further comprise giving a print instruction to print the content to a printer.

19. An information processing apparatus configured to edit content, the information processing apparatus comprising:

one or more processors; and

at least one memory storing instructions, which when executed by the one or more processors, cause the information processing apparatus to:

convert a first set of values representing a first color of a predetermined region including the content to a second set of values representing the first color of the predetermined region;

convert a third set of values representing a color of the content to a fourth set of values representing the color of the content;

determine respective differences between each value of the second set of values and each corresponding value of the fourth set of values;

compare the respective differences with a predetermined threshold; and based on a result of the comparison, change the first color of the predetermined region to a second color different from the first color.

20. A control method for editing content, the control method comprising:

converting a first set of values representing a first color of a predetermined region including the content to a second set of values representing the first color of the predetermined region;

converting a third set of values representing a color of the content to a fourth set of values representing the color of the content;

determining respective differences between each value of the second set of values and each corresponding value of the fourth set of values;

comparing the respective differences with a predetermined threshold; and based on a result of the comparison, changing the first color of the predetermined region to a second color different from the first color.

\* \* \* \* \*